United States Patent [19]

Frait et al.

[11] Patent Number: 4,721,344
[45] Date of Patent: Jan. 26, 1988

[54] ELECTRIC BRAKE CONTROLLER

[75] Inventors: John S. Frait, Ann Arbor; Michael D. Warner, Oak Park; David T. Ayers, Birmingham, all of Mich.

[73] Assignee: Kelsey-Hayes Company, Romulus, Mich.

[21] Appl. No.: 663,638

[22] Filed: Oct. 22, 1984

[51] Int. Cl.[4] .............................................. B60T 13/74
[52] U.S. Cl. .......................................... 303/20; 303/7; 307/356
[58] Field of Search ................... 303/20, 7, 93, 92, 94, 303/95, 6 A; 188/181 R, 181 A, 181 C; 307/519, 359, 356

[56] References Cited

U.S. PATENT DOCUMENTS

| | | | |
|---|---|---|---|
| 3,350,142 | 10/1967 | Schuman | 303/7 |
| 3,574,414 | 4/1971 | Jacob | 303/20 |
| 3,874,743 | 4/1975 | Fleischer et al. | 303/92 |
| 3,909,075 | 9/1975 | Pittet | 303/20 |
| 4,074,194 | 2/1978 | Wilkerson | 324/124 |
| 4,084,859 | 4/1978 | Bull et al. | 303/20 |
| 4,295,687 | 10/1981 | Becker et al. | 303/20 |

OTHER PUBLICATIONS

Herbert Taub and Donald Schilling, "Digital Integrated Electronics", (New York:McGraw-Hill Book Co. 1977), pp. 192-193.

Primary Examiner—John W. Caldwell, Sr.
Assistant Examiner—Alvin Oberley
Attorney, Agent, or Firm—Ralph J. Skinkiss; Mark J. Sobanski

[57] ABSTRACT

An electric brake control circuit is responsive to an activation signal and a vehicle deceleration signal for generating a brake control signal representing a predetermined amount of braking. A comparator compares the voltage level of the brake control signal with the voltage level of a sawtooth waveform to produce a pluse width modulated signal having a duty cycle corresponding to the predetermined amount of braking. This pulse width modulated signal is supplied to an output driver for generating a brake driving signal to energize the brakes. The activation signal is generated at the voltage level of the vehicle power supply when the driver actuates the vehicle stop light switch. The circuit is responsive to the activation signal for disabling the output driver when the voltage level of the activation signal is below a predetermined level. The circuit also senses the current load on the brake driving signal to protect the output driver in the event of a full or partial short circuit condition. As the sensed current load progressively exceeds a predetermined level, the circuit progressively increases the average voltage level of the sawtooth waveform, thus causing the comparator to reduce the duty cycle of the pulse width modulated signal.

5 Claims, 9 Drawing Figures

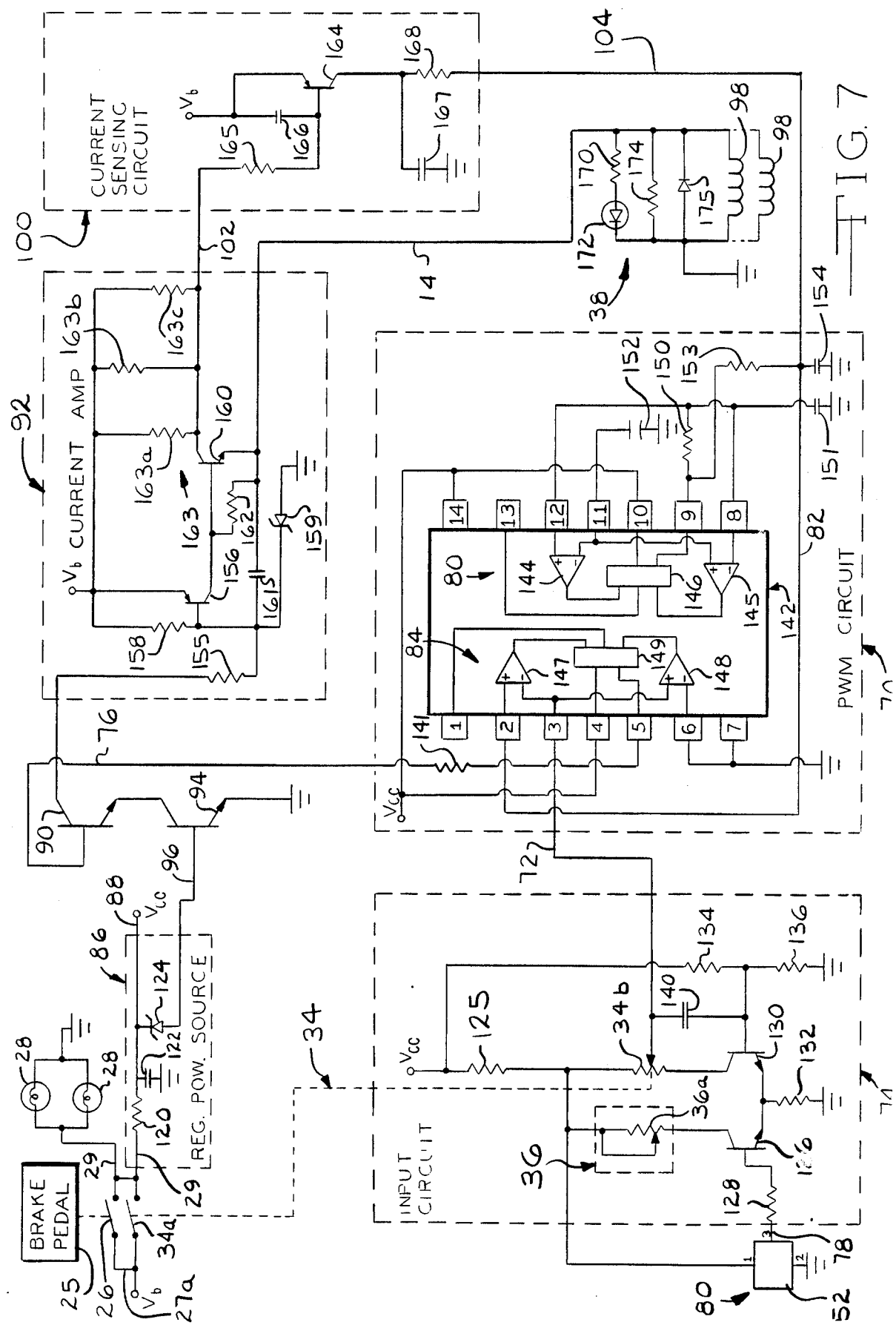

ELECTRIC BRAKE CONTROLLER

BACKGROUND OF THE INVENTION

The present invention relates in general to an electric brake controller for energizing electrically operated brakes in a towed vehicle and, in particular, to an electric brake controller which incorporates a means for sensing the deceleration of the towing vehicle and for generating a brake energizing signal as a function of the deceleration.

Recreational and utility trailers adapted to be towed by automobiles and small trucks and many similar towed vehicles are commonly provided with electric brakes. The electric brakes generally comprise a pair of brake shoes which, when actuated, frictionally engage a brake drum. An electromagnet is mounted on one end of a lever coupled to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet.

To ensure proper operation, a control system for electrically operated brakes must be easily adjustable to accommodate different relative weights of the towed and towing vehicles. Also, the control system must be predictable to give the driver of the towing vehicle a feeling of smooth and positive brake operation both upon applying and releasing the brakes in the towing vehicle.

In one type of electronic brake control system, such as the system disclosed in U.S. Pat. No. 4,295,687, the electric brakes are actuated in response to the operation of the towing vehicle's brake pedal by the driver. In this system, a transducer produces a brake control signal corresponding to the desired braking effort by sensing either (1) the hydraulic pressure in the braking system of the towing vehicle or (2) the pressure applied by a driver's foot to the towing vehicle's brake pedal. A pulse width modulator is responsive to the brake control signal for generating a fixed frequency pulsed output signal having a duty cycle proportional to the amount of braking effort desired.

Various towed vehicle braking systems have been proposed wherein the braking of the trailer is automatically controlled by the sensing of deceleration forces. For example, U.S. Pat. Nos. 2,242,153; 2,642,961; 2,779,443; 2,856,036; and 2,969,857 all disclose automatic brake applying systems wherein the deceleration inertial force imposed upon the hitch by the trailer during deceleration of a towing vehicle is sensed and used to effect braking of the trailer.

Also, it has been proposed to use a pendulum or a mass movement sensing device for sensing the deceleration of a towing vehicle and for operating either a mechanical or an electrical braking system in the towed vehicle. Examples of such pendulum systems are disclosed in U.S. Pat. Nos. 2,870,876 and 3,053,348.

One type of electronic brake controller which includes a pendulum unit for sensing the deceleration of the towing vehicle is disclosed in U.S. Pat. No. 3,953,084. In this patent, the pendulum is provided with a shield to block the passage of light from a light source to a light sensing unit when the pendulum is in a resting position. When the brakes of the towing vehicle are operated and the vehicle decelerates, the pendulum will swing to permit light to fall on the light sensing unit which then generates a control signal. The brake controller is responsive to the control signal for producing a pulsed output signal having a fixed frequency and a variable pulse width proportional to the level of the control signal.

SUMMARY OF THE INVENTION

The present invention relates to a self-contained electric brake controller which incorporates a unique deceleration sensing unit for generating a signal proportional to the magnitude of deceleration of the towing vehicle. The controller includes a circuit responsive to the deceleration signal for generating a brake driving signal to control the brakes of the towed vehicle.

The deceleration sensing unit of the present invention includes a support means such as an outer housing adapted to be secured relative to the towing vehicle and a pendulum mounted on an axis for pivotal movement relative to the housing. The pendulum is movable in one direction from a resting position to a predetermined extended position when the vehicle is subjected to a predetermined amount of deceleration. Means are coupled to the pendulum for generating a signal corresponding to the predetermined extended position of the pendulum. This signal represents the predetermined amount of deceleration to which the vehicle is subjected.

In accordance with the present invention, the deceleration sensing unit includes means for applying a restoring force to the pendulum to resist further movement of the pendulum in the one direction from the extended position. It has been found that by providing such a restoring force, the outward movement of the pendulum is limited and the pendulum can be returned to its resting position more rapidly than if gravity provided the sole restoring force. This stabilizes the operation of the controller and provides more accurate braking control. In the preferred embodiment of the invention, the pendulum includes a first magnet spaced from the pivot axis of the pendulum, and the restoring force is produced by a second magnet carried by the housing and spaced from the pendulum. This second magnet is adapted to produce a magnetic field which, as the pendulum swings to its extended position, opposes the magnetic field produced by the first magnet and exerts a magnetic force on the pendulum to retard further movement of the pendulum in the one direction.

Also, the deceleration sensing unit includes damping means which is spaced from the magnet carried by the pendulum for reducing undesirable movement of the pendulum. The damping means is typically constructed of a ferromagnetic material which is attracted to the pendulum magnet in a direction perpendicular to the movement of the pendulum. The ferromagnetic material dampens the movement of the pendulum such that sudden forces transmitted to the pendulum such as road shocks, for example, will not cause undesirable movement of the pendulum.

In the preferred embodiment of the invention, the means coupled to the pendulum for generating a signal corresponding to the predetermined extended position of the pendulum includes a detector such as a Hall effect device which is carried by the housing and is spaced from the magnet of the pendulum. The detector is responsive to the magnetic field generated by the magnet for generating a position signal representing the predetermined extended position of the pendulum. This position signal corresponds to the predetermined magnitude of deceleration of the vehicle.

The control circuit which is responsive to the deceleration signal generated by the deceleration sensing unit includes several unique features. Typically, the control circuit includes a control means responsive to an activation signal and the deceleration signal for generating a brake control signal representing a predetermined amount of braking. A comparator means compares the voltage level of the brake control signal with the voltage level of a sawtooth waveform to produce a pulse width modulated signal having a duty cycle corresponding to the predetermined amount of braking. This pulse width modulated signal is supplied to an output drive means for generating a brake driving signal to energize the brakes.

In the circuit of the present invention, the activation signal is generated when the driver either (1) steps on the vehicle brake pedal to close a stop light switch or (2) actuates a manual control switch, either of which supplies the activation signal at the voltage level of the vehicle power source. The circuit is provided with means responsive to the activation signal for disabling the output drive means when the voltage level of the activation signal is below a predetermined level. This prevents the electric brake controller from generating a brake driving output signal in instances wherein, due to circuit problems such as an insufficient ground in the stop light circuit, the control means receives a lower level activation signal when neither the stop light switch or the manual control has been actuated.

Also, the present invention includes means for sensing the current load on the brake driving signal to protect the output drive means in the event of a full or partial short circuit condition. Such sensing means are responsive to a sensed current load progressively exceeding a predetermined level for progressively increasing the average voltage level of the sawtooth waveform, thus causing the comparator means to reduce the duty cycle of the pulse width modulated signal. Thus, in the event of a partial short circuit condition, limited braking is maintained.

In the present invention, a foot actuated means such as a brake pedal stop light switch can be utilized to generate a first brake control signal representing a first desired amount of braking, while a hand actuated means such as a manual control can be used to generate a second brake control signal representing a second desired amount of braking. With the present invention, means are responsive to the first and second brake control signals for generating a composite brake control signal representing the combined braking of the first and second braking control signals.

BRIEF DESCRIPTION OF THE DRAWINGS

The above, as well as other advantages of the present invention, will become readily apparent to one skilled in the art from reading the following detailed description in conjunction with the attached drawings, in which:

FIG. 7 is a schematic diagram illustrating a preferred embodiment of the circuit shown in FIG. 5.

DESCRIPTION OF THE PREFERRED EMBODIMENT

Figure 1:
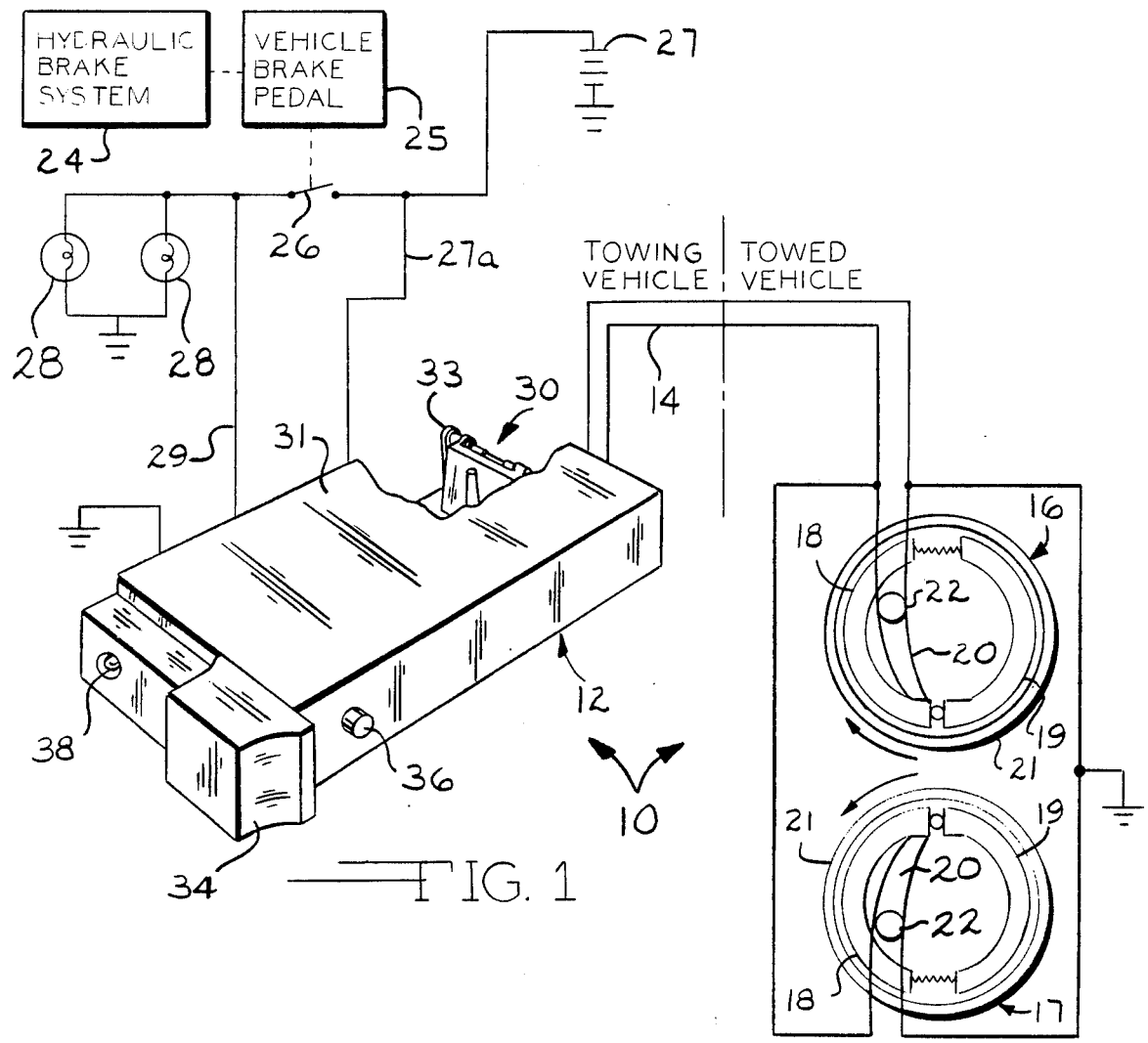
FIG. 1 is a schematic diagram illustrating an electric braking system utilizing an electric brake controller according to the present invention.

Referring to the drawings, and particularly to FIG. 1, there is shown a schematic diagram of an electric brake system 10 which utilizes an electronic brake controller 12 embodying the principles of the present invention. The brake controller 12 is generally located in the towing vehicle and, when activated, functions to generate an electric signal on a line 14 to energize electric brakes 16 and 17 utilized to brake the wheels of the towed vehicle. The electric brakes 16 and 17 each include a pair of brake shoes 18 and 19 which, when actuated by a lever 20, are expanded into contact with a brake drum 21 for braking the wheels of the towed vehicle. A separate electromagnet 22 is mounted on an end of each of the brake actuating levers 20. Each electromagnet 22 is positioned to abut the generally flat side of a brake drum 21. As an electric current is passed through each of the electromagnets 22, the electromagnets are drawn into contact with the brake drums 21 and the resulting drag pivots the levers 20 to engage the brakes 16 and 17 in a conventional manner.

The towing vehicle typically includes a conventional hydraulic brake system 24 which is activated when a brake pedal 25 is depressed by the driver. The brake pedal 25 is coupled to a stop light switch 26 such that, when the brake pedal 25 is depressed, the switch 26 is closed and power from a vehicle power supply 27 is applied to one or more brake lights 28. The vehicle power supply 27 is also connected to provide power to the controller 12 on a line 27a. When the stop light switch 26 is closed, power is supplied on a line 29 as an activation signal to activate the controller 12.

When the stop light switch 26 is closed and the controller 12 is activated, the controller 12 functions to generate an electric output signal on the line 14 having a current which is directly proportional to the braking force applied to the towing vehicle. In order to generate such a signal, the controller 12 incorporates a unique means for sensing the deceleration of the towing vehicle and for generating a signal which is a function of the deceleration of the vehicle. Such a deceleration sensing unit is generally indicated in FIG. 1 by reference numeral 30. As shown in FIG. 1, the deceleration sensing unit 30 is located within an outer casing 31 of the electronic controller 12. As will be discussed in more detail hereinafter, the deceleration sensing unit 30 includes a pendulum adapted to swing in one direction when the towing vehicle is decelerating, and means for generating a signal representing the amount of swinging movement of the pendulum. Also, the deceleration sensing unit includes a leveling means 33 which, as will be discussed, extends from the side wall of the casing 31 and is utilized to level the sensing unit 30 after the casing 31 has been securely mounted to the vehicle.

In some instances, it may be desirable to only actuate the brakes 16 and 17 in the towed vehicle. This may be desirable, for example, to stabilize the towed vehicle against vacillations or swinging caused by strong side winds. Therefore, a manual slide control 34 is provided on the electronic controller 12 to allow the vehicle driver to manually apply the towed vehicle brakes 16 and 17 without applying the towing vehicle brakes.

The electronic controller 12 also is provided with a manual gain control 36. The gain control 36 allows the vehicle driver to compensate for different loads in the towed vehicle. For example, as the load in the towed vehicle increases, it is necessary to increase the braking force in the towed vehicle relative to the braking force applied in the towing vehicle. By adjusting the gain control 36, the power applied by the electronic controller 12 to the electromagnets 22 may be increased or decreased for any given output from the deceleration sensing unit 30.

The electronic brake controller 12 includes an indicator light 38. The intensity of the light 38 is proportional to the average current level of the signal generated on the line 14 used to actuate the towed vehicle brakes 16 and 17. The light 38 provides a visual indication to the driver to show that the controller 12 is operating properly.

Figure 2:
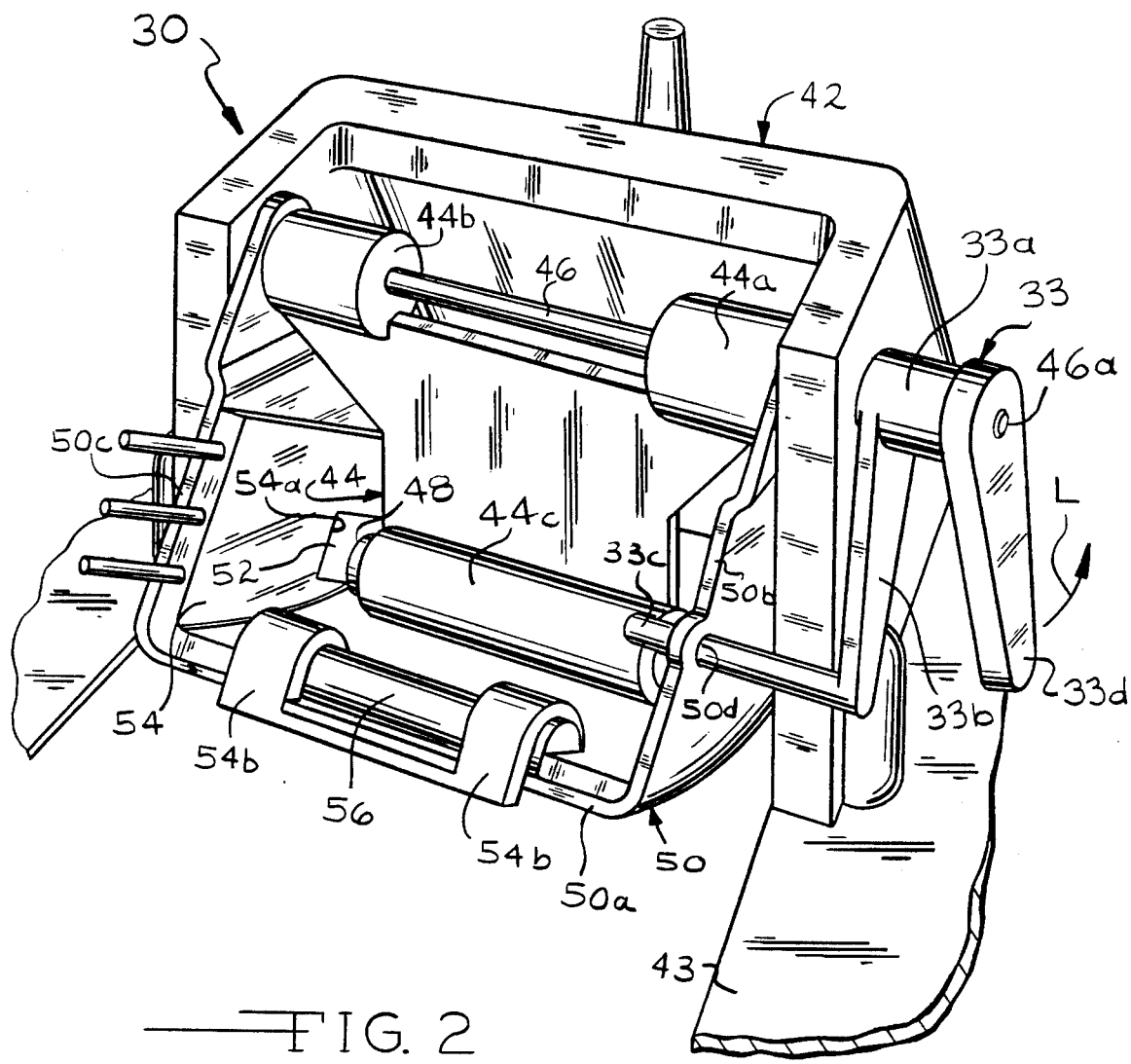
FIG. 2 is an enlarged perspective view illustrating a deceleration sensing unit incorporated in the brake controller of FIG. 1.
Figure 3:
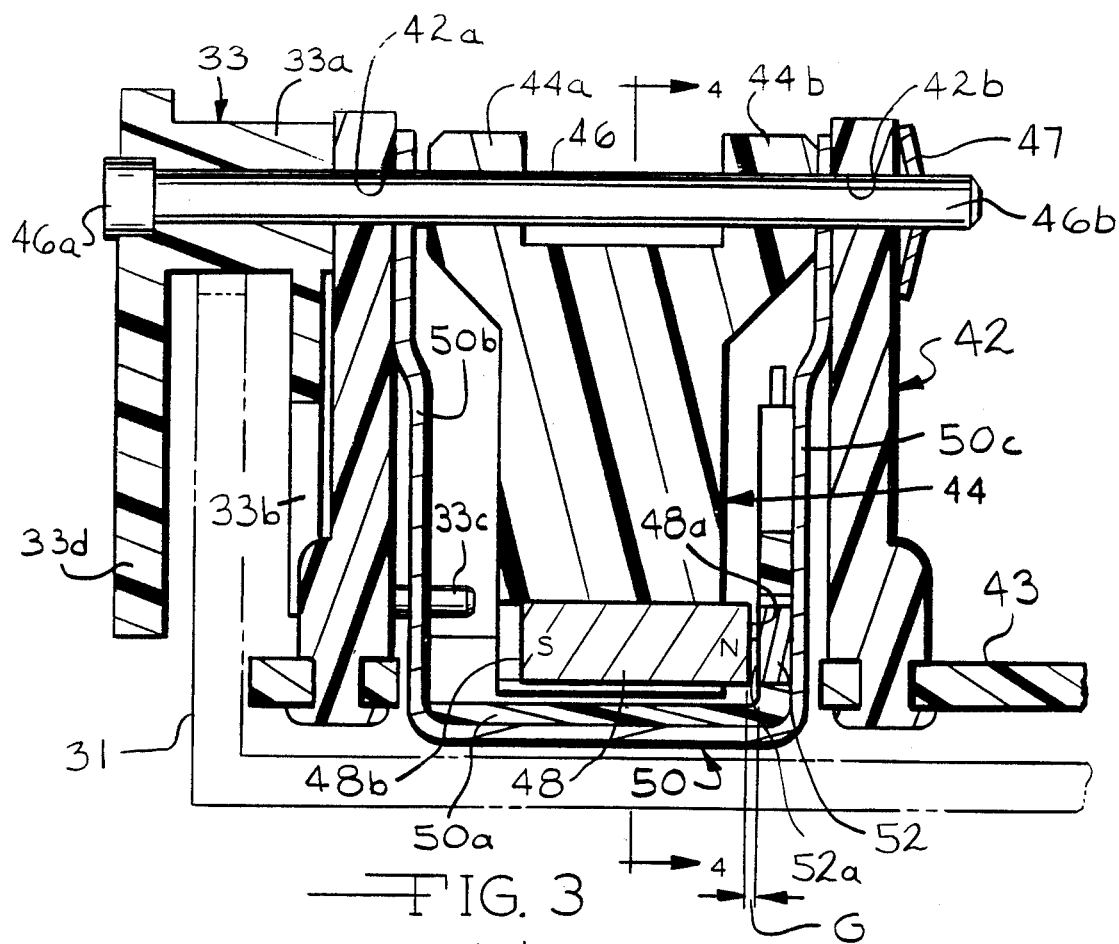
FIG. 3 is a sectional view of the deceleration sensing unit taken along the line 3—3 of FIG. 2.
Figure 4:
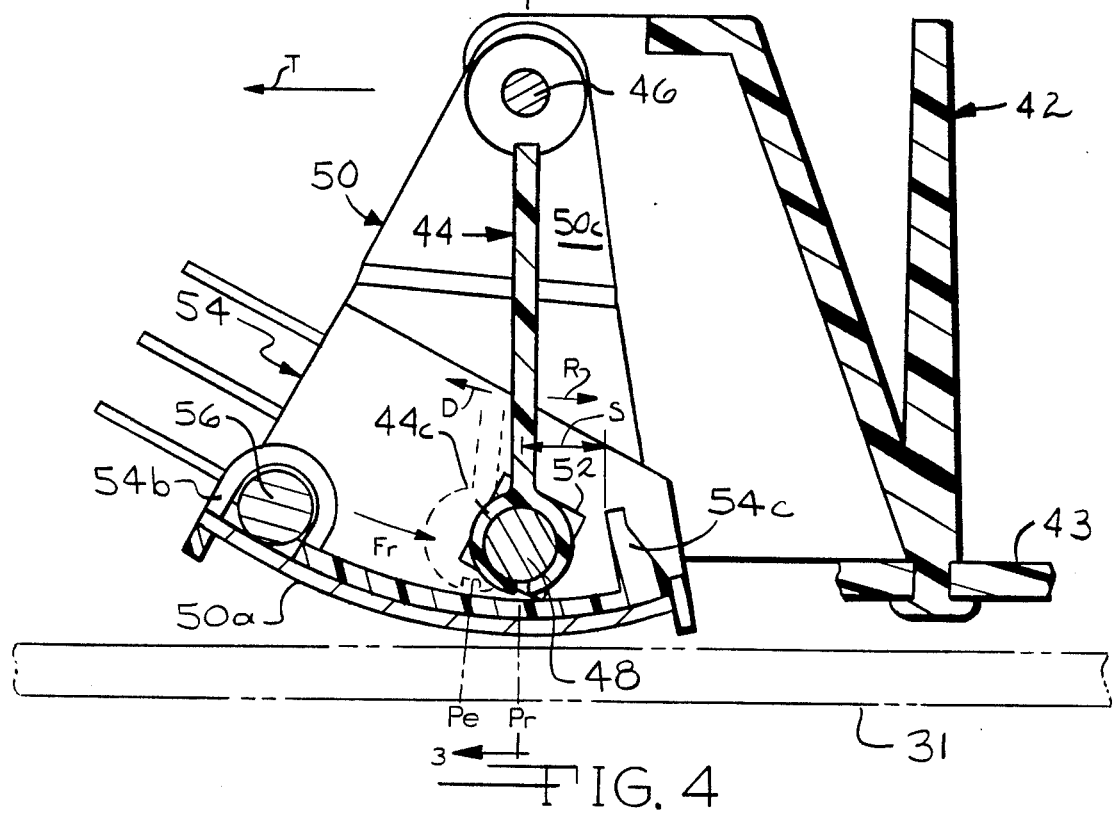
FIG. 4 is a side sectional view of the deceleration sensing unit taken along the line 4—4 of FIG. 3.

Referring to FIGS. 2 through 4, there are shown enlarged drawings illustrating a preferred embodiment of the deceleration sensing unit 30 of the present invention. The deceleration sensing unit 30 comprises an outer plastic housing 42 which is secured to a circuit board 43 supported within the controller casing 31. A pendulum 44 is supported for swinging movement relative to the housing 42 by means of a pivot prn 46. As shown in FIG. 3, the pivot pin 46 extends through apertures 42a and 42b formed in the side walls of the housing 42 and through spaced-apart low friction bearing elements 44a and 44b provided in the upper end of the pendulum. If desired, a lubricant can be introduced between the bearing elements 44a and 44b and the pin 46. The one end of the pin 46 is provided with a head portion 46a received by the leveling means 33, while the opposite end 46b is secured by a retaining clip 47. The lower end of the pendulum is provided with a downwardly facing C-shaped clamp 44c (shown in FIG. 4) for receiving and frictionally engaging a cylindrical magnet 48. As will be discussed, the magnet 48 functions both as a weight and as a means for indicating the position of the lower end of the pendulum.

Normally, as shown in FIG. 4, when the vehicle is traveling in a direction T and is not subjected to any deceleration or acceleration forces, the pendulum will be located in a resting position $P_r$. As the towing vehicle brakes are applied and the towing vehicle is decelerated, the pendulum will swing outwardly in a forward direction D to a predetermined extended position $P_e$, as determined by the magnitude of deceleration of the towing vehicle.

In order to reduce undesirable movement of the pendulum 44 when the sensing unit 30 is subjected to sudden forces other than deceleration such as road shock, for example, it is desirable to dampen the movement of the pendulum 44. It has been found that satisfactory damping can be achieved by locating a ferromagnetic element such as a metal channel 50 in spaced apart relationship with pendulum magnet 48. The metal channel 50 includes an arcuate lower wall 50a connected to a pair of spaced apart triangular shaped side walls 50b and 50c having apertures formed in the upper ends therefore for receiving the pivot pin 46. It has been found that the magnetic attraction between the pendulum magnet 48 and the surrounding metal channel 50 provides the necessary damping in the movement of the pendulum such that the road shocks transmitted to the pendulum 44 will not cause undesirable movement of the pendulum. Also, it has been found that the metal channel 50 shields the magnet 48 from external influencing or demagnetization forces.

The movement of the lower end of the pendulum relative to a normal vertical resting position is sensed by a detector means such as a Hall Effect device 52 spaced from and positioned adjacent one end 48a of the pendulum magnet 48. The Hall Effect device 52 is supported adjacent the magnet 48 within a square shaped opening 54a formed in a plastic carrier 54 seated within the metal channel 50. As the pendulum swings from the resting position $P_r$, the Hall Effect device 52 is adapted to generate a voltage proportional to the amount of movement of the pendulum 44.

In accordance with the present invention, the deceleration sensing unit 30 includes means for providing a restoring force to the pendulum such that the pendulum can be returned to its resting position more rapidly than if gravity provided the sole restoring force. While it will be appreciated that various types of spring biasing means could be utilized to provide this function, it has been discovered that a separate magnet positioned in spaced apart relationship to the lower end of the pendulum 44 can be utilized to provide a restoring force which increases in magnitude as the pendulum swings further from its resting position. As shown in FIG. 4, a restoring magnet 56 is positioned near one end of the upper surface of the lower arcuate wall 50a of metal channel 50 and is supported thereon by a pair of spaced apart inverted U-shaped clips 54b provided in the plastic carrier 54. As the pendulum swings forwardly, the magnetic field of restoring magnet 56 will oppose the magnetic field of pendulum magnet 48 and a restoring force $F_r$ will oppose further forward movement of the pendulum in the direction D from the extended position $P_e$. It has been found that providing such a restoring force to the pendulum of the deceleration sensing unit enhances the operator's controllability of the combined braking system.

In addition to supporting the Hall Effect device 52 and the restoring magnet 56, the plastic carrier 54 is also provided with an upwardly projecting stop means 54c (shown in FIG. 4) to limit the rearward swinging movement of the pendulum in the direction R. The stop means 54c is positioned a predetermined distance S from the center of the Hall Effect device 52 and, as will be discussed, prevents the user from adjusting the pendulum in a reverse direction.

In order to achieve proper operation, it is necessary that the resting position of the pendulum relative to the center of the Hall Effect device 52 be adjusted after the controller casing 31 has been securely mounted in the towing vehicle. The controller can be mounted under the vehicle dashboard, for example. This adjustment can be accomplished by leveling means 33. The leveling means 33 includes a sleeve member 33a for receiving the pivot pin 46. An inner lever arm 33b extends radially from the sleeve member 33a and has an outer end provided with an axially extending pin 33c which projects into an aperture 50d formed in the side wall 50b of the metal channel 50. The outer end of the sleeve member 33a, which is adapted to extend outwardly from the casing 31, is provided with an outer lever arm 33d.

In order to adjust the position of the Hall Effect device 52 relative to the pendulum 44, the lever arm 33d is pivoted about the pivot pin 46, thus causing the inner lever 33b and the pin 33c to pivot the metal channel 50 and the Hall Effect device 52. Typically, the retaining clip 47 is pressed sufficiently on the pin end 46b to cause the leveling means 33 and the metal channel 50 to be frictionally held relative to the plastic housing 42 about the pin 46, thus maintaining the adjusted position of the leveling means 33. The above adjustment is relatively simple, and consists of merely having the operator activate the controller on level ground by depressing the vehicle brake pedal, and then pivoting the outer lever arm 33d in a direction which causes relative movement of the pendulum in the direction D until the indicator light 38 just begins to light. If the operator were to accidently pivot the lever arm 33d in an opposite direction such that pendulum moves toward the stop means 54c, the stop means 54c prevents movement of the pendulum to a point which causes the indicator light 38 to turn on. Thus, the operator is prevented from adjusting the unit in the reverse direction.

In addition to adjusting the resting position of the pendulum 44 relative to the center of the Hall Effect device 52, another important adjustment is the spacing between the end wall 48a of the pendulum magnet 48 and the facing surface 52a of the Hall Effect device 52, as represented by dimension G in FIG. 3. Not only is the initial adjustment of the spacing G important, it is also important that this spacing be maintained during the swinging movement of the pendulum. To ensure that such spacing is maintained, the pendulum magnet is axially positioned in the C-shaped clamp 44c such that the distance between the one end 48a and the side wall 50c of the channel 50 is slightly less than the distance between the opposite end 48b and the side wall 50b. Thus, the magnetic attraction between the magnet 48 and the side wall 50c is slightly greater than the magnetic attraction between the magnet 48 and the side wall 50b. This causes the pendulum to be biased toward the side wall 50c such that the outer end of the bearing element 44b always remains in contact with the inner surface of the side wall 50c, while the outer end of the bearing element 44a is spaced from the inner surface of the side wall 50b.

It should be noted that, while the deceleration sensing unit of the preferred embodiment includes a pendulum mounted for pivotal movement about a generally horizontal axis, it will be appreciated that the deceleration sensing unit can utilize other types of mass movement sensing elements which, if desired, can be pivotally mounted about a vertical axis.

Figure 5:
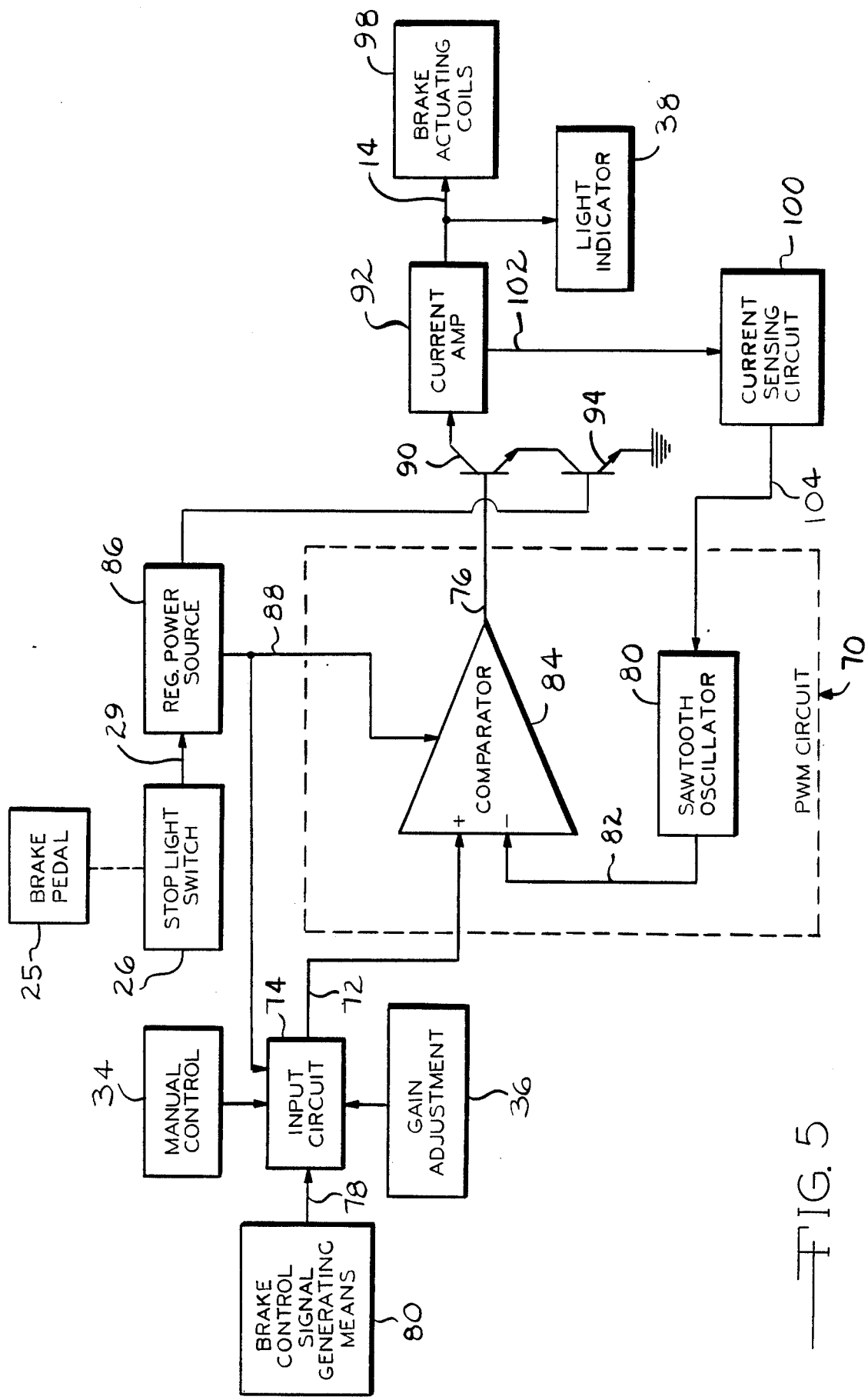
FIG. 5 is a block diagram illustrating the electronic control circuit of the present invention.

The circuit utilized to generate the electric brake control signal is shown in block diagram form in FIG. 5 and includes several unique features. Basically, the circuit utilizes a pulse width modulating (PWM) circuit 70 which receives a brake control signal representing the desired braking on a line 72 from an input circuit 74, and generates a square wave pulse train on a line 76 having a duty cycle directly proportional to the level of the brake control signal on the line 72. The modulated pulse train on the line 76 is then amplified to produce a brake driving signal on the line 14 to actuate the electric brakes.

The input circuit 74 receives a signal on a line 78 from a brake input signal generating means 80. The brake input signal generating means 80 can be a deceleration sensing unit of the type illustrated in FIGS. 2 through 4 which is adapted to generate a signal as a function of the deceleration of the towing vehicle. It will be appreciated that other types of deceleration sensing units could also be utilized with the circuit of the present invention. Also, the brake input signal generating means 80 can be a transducer (not shown) coupled to the hydraulic system of the towing vehicle for generating a signal proportional to the hydraulic pressure in the towing vehicle braking system, or a pressure transducer which is coupled to sense the pressure applied to the vehicle brake pedal by the driver. Such transducers are disclosed in U.S. Pat. No. 4,295,687, which is herein incorporated by reference.

The input circuit 74 also receives signals from the manual control 34 and the gain adjustment 36, whose functions have previously been discussed with reference to FIG. 1. However, it should be noted that, in the circuit of the present invention, the voltage level of the brake control signal on the line 72 represents the combination of the signals received from the brake control signal generating means 80 and the manual control 34. Thus, when the input circuit is generating a brake control signal on the line 72 at a predetermined level in response to a brake input signal received on the line 78 from the brake input signal generating means, actuation of the manual control 34 will increase the level of the brake control signal. In prior art systems, the brake control signal on the line 72 corresponded to the higher of the two signals supplied to the input circuit, and did not represent a combination of the two.

The PWM circuit 70 includes a sawtooth oscillator 80 which functions to generate a triangular shaped waveform on a line 82 as one input to a comparator 84. A second input of the comparator 84 is connected to receive the brake control signal on the line 72. When the level of the brake control signal on the line 72 is greater than the level of the triangular waveform on the line 82, the comparator 84 will generate a high level output signal such that a square wave signal will appear on the line 76. The duty cycle of the square wave PWM signal on the line 76 is directly proportional to the level of the brake control signal on the line 72.

When the vehicle brake pedal 25 is depressed, the stop light switch 26 supplies a power signal to a regulated power source 86 which generates a regulated voltage on a line 88 to activate the input circuit 74 and the PWM circuit 70. When the input circuit 74 and the PWM circuit 70 are activated, the PWM circuit 70 will generate a PWM output signal on the line 76.

Under normal operating conditions, the PWM output signal on the line 76 is supplied to the base of a transistor 90 having a collector coupled to supply the PWM output signal as an input to a current amplifier 92. However, before the output of the PWM circuit can be supplied to the current amplifier 92 through the transistor 90, a second transistor 94, having a collector connected to the emitter of the transistor 90 and an emitter connected to the circuit ground potential, must receive an enabling signal on a line 96 from the regulated power source 86. In accordance with the present invention, the enabling signal is only supplied to the transistor 94 when the voltage level supplied to the regulated power source 86 on the line 29 exceeds a predetermined level. Thus, in instances wherein, due to certain vehicle circuit problems, the stop light switch is not actuated and a lower level voltage signal may be inadvertently supplied to the regulated power source 86 on the line 29, the transistors 90 and 94 will remain in the off state and the output of the PWM circuit 70 will not be supplied to the current amplifier 92.

The output of the current amplifier 92 is generated on the line 14 which is connected to brake actuating coils 98 adapted to actuate the electromagnets 22 shown in FIG. 1. The indicator light 38 is connected to the line 14, and lights when a brake driving signal is present on the line 14. The intensity of the light 38 will be proportional to the average current level of the signal on the line 14.

The brake controller of the present invention includes a current sensing circuit 100 which receives a signal on a line 102 from the current amplifier 92 representing the current load on the brake output signal on the line 14. In the event the brake output current exceeds a predetermined level such as, for example, when a short is developed in one of the brake coils 98, the current sensing circuit 100 functions to reduce the level of the brake output current signal to the brake coils 98. In accordance with the present invention, the current sensing circuit 100 generates a limiting signal to the oscillator 80 on a line 104 which functions to progressively increase the overall level of the sawtooth waveform derived from the oscillator 80 on the line 82. This causes the duty cycle of the PWM on the line 76 to be progressively reduced, thus causing the output current level to be reduced.

Figures 6A, 6B, 6C:
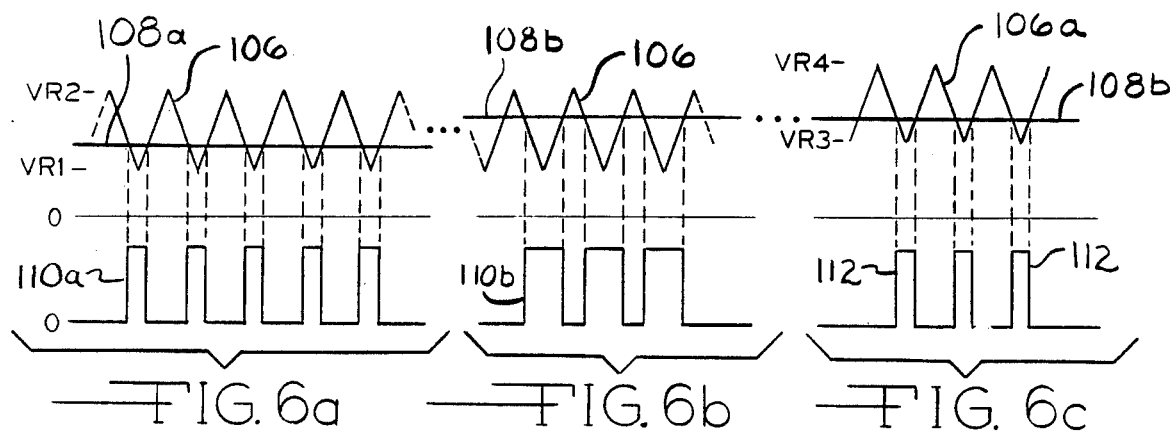
FIGS. 6a, 6b, and 6c are waveform diagrams illustrating signals generated by the circuit of FIG. 5.

FIGS. 6a, 6b, and 6c are waveform diagrams which can be used to summarize the operation of the circuit of FIG. 5. In FIGS. 6a and 6b the sawtooth oscillator 80 generates an output waveform 106 which oscillates between voltage levels VR1 and VR2. The waveform 106 will have a constant frequency which may be, for example, on the order of 400 Hz. to 600 Hz., although frequencies outside this range also may be used. The brake control voltage on the line 72 from the input circuit 74 is illustrated as a first constant voltage level 108a in FIG. 6a, and at a higher constant voltage level 108b in FIG. 6b. This would represent the condition where the driver initially applies a light force to the brake pedal and, subsequently, applies a heavier force to the pedal. When the input circuit 74 generates the lower level output voltage 108a, the voltage 108a will be above the output waveform 106 from the oscillator 80 only for short periods in each cycle. During these short periods, the comparator 84 generates relatively narrow pulses 110a (shown in FIG. 6a) which are applied to the current amplifier 92 through the transistor 90. As the voltage level of the brake control signal on the line 72 increases to the level 108b, as shown in FIG. 6b, it will be seen that the comparator 84 will have an output in the form of pulses 110b which have a greater width than the pulses 110a. Since the pulses are wider and there is no change in frequency, there is a greater duty cycle. Under a maximum braking condition, the width of the pulses 110b may increase until the comparator 84 applies a substantially constant voltage to the current amplifier 92 to fully actuate the towed vehicle brakes 16 and 17.

In the event that a partial short circuit occurs while the input circuit generates a brake control signal at the voltage 108b, the excessive current will cause the current sensing circuit 100 to generate a limiting signal on the line 104 to increase the voltage levels between which the waveform 106 oscillates such that, as shown in FIG. 6c, a waveform 106a, having a frequency similar to the waveform 106, oscillates between increased voltage levels VR3 and VR4, thus increasing the average voltage level of the waveform 106a as compared to the waveform 106. This causes the pulses 110b of FIG. 6b to be terminated short to produce reduced widths pulses 112 of FIG. 6c. By terminating the pulses 110b early, the duty cycle for the current amplifier 92 is shortened to limit the power dissipated by the components of the amplifier and, therefore, to protect the components from destruction. In the event of a total short circuit connecting the line 14 to ground, the level of the waveform 106 will be increased to a level wherein the current amplifier 92 remains substantially in the off state.

A preferred embodiment of the brake control circuit shown in FIG. 5 is illustrated in FIG. 7. In FIG. 7, the vehicle battery voltage (Vb) on the line 27a (from the power source 27 of FIG. 1) is supplied to the regulated power source 86 through the closing of either the stop light switch 26 or the closing of a single pole switch 34a included in the manual control 34. The regulated power source 86 includes a resistor 120 connected between the line 29 and the Vcc output line 88. A capacitor 122 connected between the line 88 and the circuit ground potential charges to a voltage level Vcc determined by the breakdown voltage of a zener diode 124. The zener diode 124 has a cathode connected to the line 88 and an anode connected to the base of the transistor 94. Both the regulated voltage Vcc and the vehicle battery voltage Vb are utilized to power various portions of the circuit.

Normally, when either the stop light switch 26 or the manual control switch 34a is closed, a Vb power signal is supplied to the regulating circuit 86 on the line 29 and, when the switches are open, the line 29 will be at the circuit ground potential. When a voltage level Vb is present on the line 29, the diode 124 will conduct and generate an enabling signal on the line 96 to turn on the transistor 94. As previously mentioned, this enables the transistor 90 to couple the output pulses of the PWM circuit to the current amplifier 92. However, in the event the switches 26 and 34a are open and the line 29 is at a voltage level above the circuit ground potential such as, for example, if there is a circuit problem in the stop light circuit such as an insufficient ground, the diode 124 will not conduct if the voltage is below the breakdown level of the diode, and the transistor 94 will remain in the off state. This prevents the controller from generating a brake output signal when either the stop light switch 26 or the manual switch 34a has not been actuated.

In the circuit of FIG. 7, the brake input signal generating means 80 is shown as the Hall Effect device 52 incorporated in the deceleration sensing unit 30 of FIGS. 2 through 4. The Hall Effect device 52 includes a power supply terminal 52-1 connected to receive a reduced level Vcc signal through a resistor 125 and a ground terminal 52-2 connected to the circuit ground. The output 52-3 of the Hall Effect device is connected to the line 78 which is supplied to the input circuit 74. The Hall Effect device 52 can be a Model No. UGN-3503U available from Sprague Electric Co. of Concord, N.H.

Basically, the input circuit 74 consists of a two transistor, common emitter bridge circuit which functions to generate a voltage on the line 72 to the PWM circuit 70 at a level representing the desired amount of braking. The input circuit 74 includes a first transistor 126 having a base connected to receive the output of the Hall Effect device 52 through a resistor 128. The emitter of the transistor 126, along with the emitter of a second transistor 130, are connected to the circuit ground potential through a resistor 132. Normally, when no deceleration is being sensed by the deceleration sensing unit and the pendulum 44 is in the resting position, the output of the Hall Effect device 52 on the line 78 is such that the transistor 126 is in the off state and just at a point to turn on.

The transistor 130 is normally biased in the on state by resistors 134 and 136 connected in series between the Vcc potential and the circuit ground potential. The base of the transistor 130 is connected to the junction of the resistors 134 and 136. When the transistor 130 is in the on state, current flows from the Vcc voltage source through the resistor 125 and a potentiometer 34b through the transistor 130 and to the circuit ground through the resistor 132. The potentiometer 34b operates in conjunction with the switch 34a as the manual slide control 34 of FIG. 1. The voltage level at the variable terminal of the potentiometer 34b appears on the line 72 as the brake control signal. A filter capacitor 140 is connected between the line 72 and the base of the transistor 130. The gain adjustment 36 of FIGS. 1 and 5 is shown in FIG. 7 as a potentiometer 36a connected between the collector of the transistor 126 and the junction between the resistor 125 and the potentiometer 34b.

Normally, when the deceleration sensing unit 30 is not subjected to any deceleration, the pendulum magnet 48 is positioned relative to the Hall Effect device 52 such that the output voltage on the line 78 is just below the voltage level required to turn on the transistor 126. At this time, the voltage level of the brake control signal on the line 72 is such that when, either the stop light switch 26 or the manual switch 34a is closed, the PWM circuit generates the output signal on the line 76 with approximately a 5% duty cycle. As deceleration is sensed by the deceleration sensing unit 30, the voltage output of the Hall Effect device 52 on the line 78 will increase to a level substantially proportional to the magnitude of deceleration of the associated vehicle. As the voltage level on the line 78 increases, the transistor 126 will turn on and current will flow through the gain adjustment potentiometer 36a and the transistor 126. As the transistor 126 begins to turn on, the transistor 130 begins to turn off and the voltage level of the brake control signal on the line 72 increases. This causes the duty cycle of the output of the PWM circuit 70 to increase. In the event additional braking is required, the operator can actuate the manual slide control 34 to move the variable terminal of the potentiometer 34 to further increase the voltage level on the line 72.

The basic component of the PWM circuit 70 shown in FIG. 5 is an LM 556 dual timer integrated circuit 142 available from National Semiconductor. The right hand portion of the circuit 142 includes a pair of internal comparators 144 and 145 having inputs connected to selected terminals of the circuit 142. The outputs of the comparators are connected to an internal flip flop 146 having an output supplied to output terminal 142-9 of the circuit 142. The left hand portion of the circuit 142 is identical to the right hand portion and includes a pair of comparators 147 and 148 and a flip flop 149. The reset terminals (142-4 and 142-10) of the flip flops 146 and 149 are connected to the Vcc power supply. Basically, the right half of the integrated circuit 142, as viewed in FIG. 7, is utilized in conjunction with an external resistor/capacitor network as the oscillator 80 of FIG. 5 to produce a sawtooth waveform at a predetermined frequency on the line 82, while the comparator 147 and the flip flop 149 of the left hand portion of the circuit 142 are utilized as the comparator 84 to produce the PWM output signal on the terminal 142-5. The comparator 148 is not used.

A resistor 150 and a capacitor 151 are connected in series between the output 142-9 of the internal flip-flop 146 and the circuit ground potential. The voltage developed across the capacitor 151 is applied to terminals 142-8 and 142-12 as an input to the comparators 145 and 144 respectively. The other inputs to the comparators are connected together through a filter capacitor 152 to ground. Each comparator compares the voltage across the capacitor 151 with a separate internal reference voltage, which can be a selected portion of the control voltage Vcc, as determined by an internal voltage divider (not shown). Therefore, when the voltage across the capacitor 151 drops below a certain first percentage of the control voltage Vcc, an output from the comparator 145 will be supplied as one input to the flip flop 146 and cause the flip flop 146 to produce a high level voltage signal at terminal 142-9. Similarly, when the voltage across the capacitor 151 exceeds a certain second percentage of the control voltage Vcc, the output of the second comparator 144 will be supplied to the other input of the flip flop 146 and cause the flip flop 146 to produce a low voltage signal at the terminal 142-9. With these inputs from the comparators 144 and 145, the flip flop 146 will develop an output with a rectangular waveform which is supplied to the capacitor 151 through the resistor 150. Consequently, there will be developed across the capacitor 151 a triangular shaped sawtooth waveform, having a frequency determined by the component values of the resistor 150 and the capacitor 151.

A second resistor and capacitor network consisting of a resistor 153 and a capacitor 154 have component values similar to the resistor 150 and the capacitor 151 such that the rectangular voltage waveform at the terminal 142-9 is supplied to the capacitor 154 through the resistor 153 and a second triangular waveform similar to the waveform across a capacitor 151 is also produced across the capacitor 154. This second triangular waveform is supplied on the line 82 to the terminal 142-2 of the circuit 142 as an input to the comparator 147. As will be discussed, a second triangular waveform identical to the first triangular waveform is produced since, in the event of a partial or full short circuit condition, the average voltage level of the second triangular waveform is increased, thereby reducing the duty cycle of the PWM signal on the line 76. If the first triangular waveform across the capacitor 151 was increased in this manner, the operation of the oscillator 80 would be adversely affected.

The other input of the comparator 147 is connected to receive the brake control voltage on the line 72 from the input circuit 74. When the control voltage from the input circuit 74 is greater than the level of the triangular waveform on the line 82, the comparator 147 generates a high level output signal to set the internal flip flop 149. This causes the flip flop 149 to generate a rectangular waveform at the terminal 142-5 having a duty cycle directly proportional to the level of the control voltage at terminal 142-3. This rectangular waveform at the terminal 142-5 is supplied through a resistor 141 to the transistor 90 on the line 76.

When a PWM signal appears on the line 76 to the transistor 90, and the transistor 94 is in the on state, the PWM signal will be coupled to the current amplifier 92. The PWM signal is supplied through a resistor 155 to the base of a transistor 156 having an emitter connected to the Vb power supply. A resistor 158 is connected between the emitter and the base of the transistor 156. A zener diode 159 has an anode connected to the ground potential and a cathode connected to the base of the transistor 156. The zener diode 159 has a breakdown voltage greater than the voltage Vb and is utilized to protect the current amplifier transistors from high level voltage spikes generated in the vehicle electrical system.

The PWM signal supplied to the base of the transistor 156 is coupled to the base of a second amplifier transistor 160 which provides the main current path between the Vb power supply and the output line 14 to the brake actuating coils 98. A filter capacitor 161 is connected between the base of the transistor 160 and the output line 14, while a resistor 162 is connected between the base and the emitter of the transistor 160.

A resistor network 163 consisting of a plurality of parallel connected resistors 163a, 163b, and 163c, each of a very low value, are connected between the Vb power supply and the collector of the output transistor 160. Because the value of each of the resistors in the network 163 is relatively low, the voltage difference across the resistors will be relatively small.

In the present invention, the current sensing circuit is adapted to sense this voltage difference and, in the event the voltage difference exceeds a predetermined amount, generates a limiting signal on the line 104 to the PWM circuit 70. The voltage level on the output line 102 of the current amplifier 92 is supplied to the base of a transistor 164 through a resistor 165. A filter capacitor 166 is connected between the base of the transistor 164 and the Vb power supply. When the voltage level on the line 102 reaches a predetermined point, the transistor 164 will turn on and begin to charge a capacitor 167 connected between the collector of the transistor 164 and the circuit ground. The voltage across the capacitor 167 is supplied to the line 104 through a resistor 168 to charge the capacitor 154. This causes the average voltage level of the sawtooth waveform on the line 82 to increase, thus reducing the duty cycle of the PWM output pulses supplied to the current amplifier. When the voltage level on the line 102 to the current sensing circuit 100 falls such that the transistor 164 turns off, the capacitor 167 will discharge on the line 82 and the triangular waveform will return to its original level.

The brake driving signal generated on the line 14 is applied to one or more brake actuating coils 98. When a braking signal is present on the line 14, current flows through a resistor 170 and a LED 172 which lights to indicate to the driver that braking current is being supplied. A resistor 174 connected between the output lines 14 and the circuit ground potential prevents the diode 172 from lighting when the brake controller is off and there is a minimal current leakage through the transistor 160 and other external vehicle wiring.

When braking current from the transistor 160 turns off, a diode 175 provides a current path to continue the flow of inductive current through the brake coils 98. During short duration operation, which is with low braking current, the current through the diode 175 will cease before the next pulse because the energy is consumed by the resistance of the coils 98. However, during long on time operation, which is with high braking current, current flows through the diode 175 until the transistor turns on again. This feature avoids damaging the transistor 160 and other components in the amplifier 92 from inductive voltage spikes.

In accordance with the provisions of the patent statutes, the principle and mode of operation of the invention have been illustrated and described in what is considered to represent its preferred embodiment. However, it should be understood that the invention can be practiced otherwise than as specifically illustrated and described without departing from its spirit or scope.

What is claimed is:

1. An electronic controller for generating a pulse width modulated signal having a desired duty cycle comprising:
    means for generating a control signal having a voltage level representing a desired duty cycle;
    oscillator means for generating a sawtooth waveform at a predetermined frequency, said sawtooth waveform having a predetermined average voltage level;
    comparator means responsive to said control signal and said sawtooth waveform for generating an output whenever the level of said control signal exceeds the voltage level of said sawtooth waveform, said output defining a pulse width modulated signal having a duty cycle corresponding to the voltage level of said control signal; and
    means for sensing the current load on said pulse width modulated signal, said sensing means responsive to said sensed current load progressively exceeding a predetermined level for progressively increasing the average voltage level of said sawtooth waveform to cause said comparator means to reduce the duty cycle of said pulse width modulated signal.

2. An improved electronic controller for energizing electrically operated brakes in a towed vehicle in response to a demand by a driver in a towing vehicle having at least one brake light for connection to a vehicle power supply through a normally open brake light switch, the brake light switch operable by the vehicle driver to close and generate an activation signal having a magnitude substantially equal to the voltage level of the vehicle power supply, the activation signal being generated at a junction between the brake light and the brake light switch, said controller comprising:
    control means responsive to the activation signal for generating a brake driving signal to energize the brakes; and
    means connected between the junction and said control means and operative to supply the activation signal to said control means only when the voltage level at the junction is above a predetermined level to prevent lower level signals present at the junction from being supplied to said control means when the brake light switch is open.

3. The controller according to claim 2 wherein said means connected between the junction and said control means includes a zener diode having a cathode connected to the junction and an anode connected to said control means.

4. An improved electronic brake control system for energizing electrically operated brakes in a towed vehicle in response to a demand by a driver in a towing vehicle, said system comprising:
    a vehicle power supply;
    a brake light;
    a normally open brake light switch connected between said vehicle power supply and said brake light, said brake light switch operable by the vehicle driver to close and generate an activation signal having a magnitude substantially equal to the voltage level of said vehicle power supply, said activation signal being generated at a junction between said brake light and said brake light switch;

control means responsive to said activation signal for generating a brake driving signal to energize the brakes; and means connected between said junction and said control means and operative to supply said activation signal to said control means only when the voltage level at said junction is above a predetermined level to prevent lower level signals present at said junction from being supplied to said control means when said brake light switch is open.

5. The controller according to claim 4 wherein said means connected between said junction and said control means includes a zener diode having a cathode connected to said junction and an anode connected to said control means.

* * * * *